(12) United States Patent
Blivet et al.

(10) Patent No.: US 7,806,444 B2
(45) Date of Patent: Oct. 5, 2010

(54) ELEMENT WELDABLE BY FRICTION TO A TUBE END, AND A CORRESPONDING WELDING METHOD

(75) Inventors: Philippe Blivet, Rennes (FR); Philippe Poder, Guichen (FR)

(73) Assignee: Legris SA, Rennes (FR)

( * ) Notice: Subject to any disclaimer, the term of this patent is extended or adjusted under 35 U.S.C. 154(b) by 343 days.

(21) Appl. No.: 11/630,433

(22) PCT Filed: Jun. 22, 2005

(86) PCT No.: PCT/FR2005/001567

§ 371 (c)(1),
(2), (4) Date: Dec. 22, 2006

(87) PCT Pub. No.: WO2006/010815

PCT Pub. Date: Feb. 2, 2006

(65) Prior Publication Data

US 2008/0012309 A1    Jan. 17, 2008

(30) Foreign Application Priority Data

Jun. 28, 2004    (FR) .................................... 04 07052

(51) Int. Cl.
*F16L 13/02* (2006.01)
(52) U.S. Cl. .............. 285/288.1; 285/288.6; 285/423; 156/73.5
(58) Field of Classification Search ............. 285/288.1, 285/288.5, 288.6, 423; 156/73.5
See application file for complete search history.

(56) References Cited

U.S. PATENT DOCUMENTS

| | | | |
|---|---|---|---|
| 3,501,110 A | * | 3/1970 | Green et al. ............. 242/118.7 |
| 4,059,294 A | | 11/1977 | Falcone et al. |
| 4,198,077 A | | 4/1980 | Oldford |
| 4,353,761 A | * | 10/1982 | Woerz et al. .................. 156/69 |
| 4,547,239 A | | 10/1985 | Carlson et al. |
| 4,690,029 A | | 9/1987 | Katzmann |

(Continued)

FOREIGN PATENT DOCUMENTS

DE    3903551    8/1989

(Continued)

OTHER PUBLICATIONS

International Search Report dated Nov. 28, 2005 in PCT application.

*Primary Examiner*—David E Bochna
(74) *Attorney, Agent, or Firm*—Young & Thompson

(57) ABSTRACT

A tubular element for securing to a tube end by friction-welding for the purpose of transporting a fluid, the element includes a body (1) having a housing (5) formed therein to receive the tube end, the housing having an inlet segment (6) for the tube end and a welding segment (9) with an inlet defined by a surface (13.2) for initiating welding. The housing further includes, between the inlet segment and the welding segment, at least one reception groove (8) for receiving a portion of the tube end that is pushed back during welding, the reception groove having a flank with at least a portion forming the weld-initiating surface and on its other side an abutment flank for the pushed-back portion. A method of friction welding is also disclosed.

6 Claims, 4 Drawing Sheets

U.S. PATENT DOCUMENTS

| | | | | |
|---|---|---|---|---|
| 5,752,725 A | * | 5/1998 | El-Sobky | 285/21.1 |
| 5,941,422 A | * | 8/1999 | Struble | 222/109 |
| 6,000,482 A | * | 12/1999 | Michalski | 175/57 |
| 6,199,916 B1 | | 3/2001 | Klinger et al. | |
| 6,453,941 B1 | * | 9/2002 | Milhas et al. | 137/515 |
| 6,733,047 B1 | * | 5/2004 | Stieler | 285/319 |
| 6,832,785 B1 | * | 12/2004 | Zitkovic, Jr. | 285/21.1 |
| 6,902,208 B1 | * | 6/2005 | Mobley et al. | 285/331 |

FOREIGN PATENT DOCUMENTS

| | | |
|---|---|---|
| EP | 0139712 | 5/1985 |
| EP | 0226771 | 7/1987 |
| FR | 1098217 | 7/1955 |
| JP | 2002228080 | 8/2002 |
| WO | 8404069 | 4/1984 |
| WO | 9424477 | 10/1994 |

* cited by examiner

ELEMENT WELDABLE BY FRICTION TO A TUBE END, AND A CORRESPONDING WELDING METHOD

The present invention relates to a tubular element for a fluid transport circuit, the element being designed to be secured to a tube end by friction welding. The invention also relates to a friction-welding method.

Such an element is constituted, for example, by a fluid-emitter element or a fluid-receiver element, and more particularly by an element for coupling the tube end, e.g. to another tube end, to a pump, to a tank . . . .

BACKGROUND OF THE INVENTION

Coupling elements are known that comprise a body in which a housing is provided for receiving the tube end. The housing has an inlet segment into which the tube end penetrates, and a welding segment having an inlet that is defined by a surface for initiating welding.

The tube end is secured to the coupling by a friction-welding method comprising the steps of:
  inserting the tube end in the housing;
  causing the tube end to rub against the weld-initiating surface in order to soften the material of the tube and the material of the element; and
  inserting the tube end into the welding segment of the housing in order to weld the tube end therein.

That technique for securing the tube end to the coupling element is particularly fast and effective with tubes and coupling elements conventionally made out of a single layer of thermoplastic material.

Nevertheless, the thermoplastic materials constituting tubes and the bodies of coupling elements are more and more frequently incorporating fillers seeking to improve their performance and in particular their ability to withstand mechanical stresses, chemical substances, high temperatures, radiation . . . Unfortunately, there is a risk that such fillers constitute non-uniform zones in a weld, thereby weakening the weld.

In addition, the operating stresses to which fluid transport tubes are subjected make it necessary to have recourse to multilayer structures in which each layer constitutes an economic response to one or more of the constraints to which the tube is subjected. By way of example, a multilayer tube may comprise an inner layer that is chemically compatible with the fluid to be conveyed, an intermediate layer that forms a gas barrier and/or that performs a mechanical reinforcement function, and an outer layer that withstands external attack such as high temperatures, ultraviolet radiation, chemical attack, . . . . Only the outer layer or the inner layer is made of a material that is suitable for welding to the material constituting the coupling element. As a result, the thickness of the material available for welding purposes is relatively small compared with the thickness available in a single-layer tube in which a greater thickness can be used for providing the weld. The stresses that result from a traction force being exerted on the tube are therefore concentrated in a relatively small zone, and that can lead to the weld being damaged.

Document U.S. Pat. No. 4,547,239 discloses an element for securing to a tube end by friction welding. The element has a housing for receiving the tube end. The housing has an inlet segment connected to a welding segment via a weld-initiating surface. A helical groove is formed in the welding segment. During welding, the material constituting the end of the tube expands into the groove. Nevertheless, retention of the tube runs the risk of being unsatisfactory in the event of strong forces acting on the tube.

OBJECT OF THE INVENTION

It would therefore be advantageous to have means that are inexpensive and reliable for providing strong friction welds on tubular elements for transporting fluid.

BRIEF DESCRIPTION OF THE INVENTION

To this end, the invention provides a tubular element for securing to a tube end by friction-welding for the purpose of transporting a fluid, the element comprising a body having a housing formed therein to receive the tube end, the housing having an inlet segment for the tube end and a welding segment with an inlet defined by a surface for initiating welding, the housing including, between the inlet segment and the welding segment, at least one reception groove for receiving a portion of the tube end that is pushed back during welding, the reception groove having a flank with at least a portion forming the weld-initiating surface and on its other side an abutment flank for the pushed-back portion.

After hardening, the pushed-back portion forms a bead that bears against the abutment flank. Thus, the stresses that result from mechanical forces being exerted on the tube are distributed both over the welded zone and over the contact zone between the pushed-back portion of the tube and the abutment flank.

Preferably, the housing is annular in shape with an inside surface that is formed by an outside surface of a nose secured to the element so as to be inserted inside the tube end.

Thus, the nose prevents the tube forming an internal bead under the effect of being inserted into the welding segment. Such a bead would constitute a constriction of the fluid flow section within the tube. The nose also performs a function of guiding the tube within the housing.

The invention also provides a friction-welding method comprising the steps of:
  inserting the tube end in a housing formed in the element;
  causing the tube end to rub against the element in order to soften the material of the tube and the material of the element; and
  inserting the tube end into the welding segment of the housing so as to weld the tube end therein. While the tube end is being inserted into the welding segment, a fraction of the tube material is pushed back so that after hardening, the pushed-back material co-operates with a surface of the element to constitute an abutment opposing extraction of the tube from the housing in the element.

Other characteristics and advantages of the invention appear on reading the following description of particular and non-limiting embodiments of the invention.

BRIEF DESCRIPTION OF THE DRAWINGS

Reference is made to the accompanying drawings, in which.

DETAILED DESCRIPTION OF THE INVENTION

Figure 1:
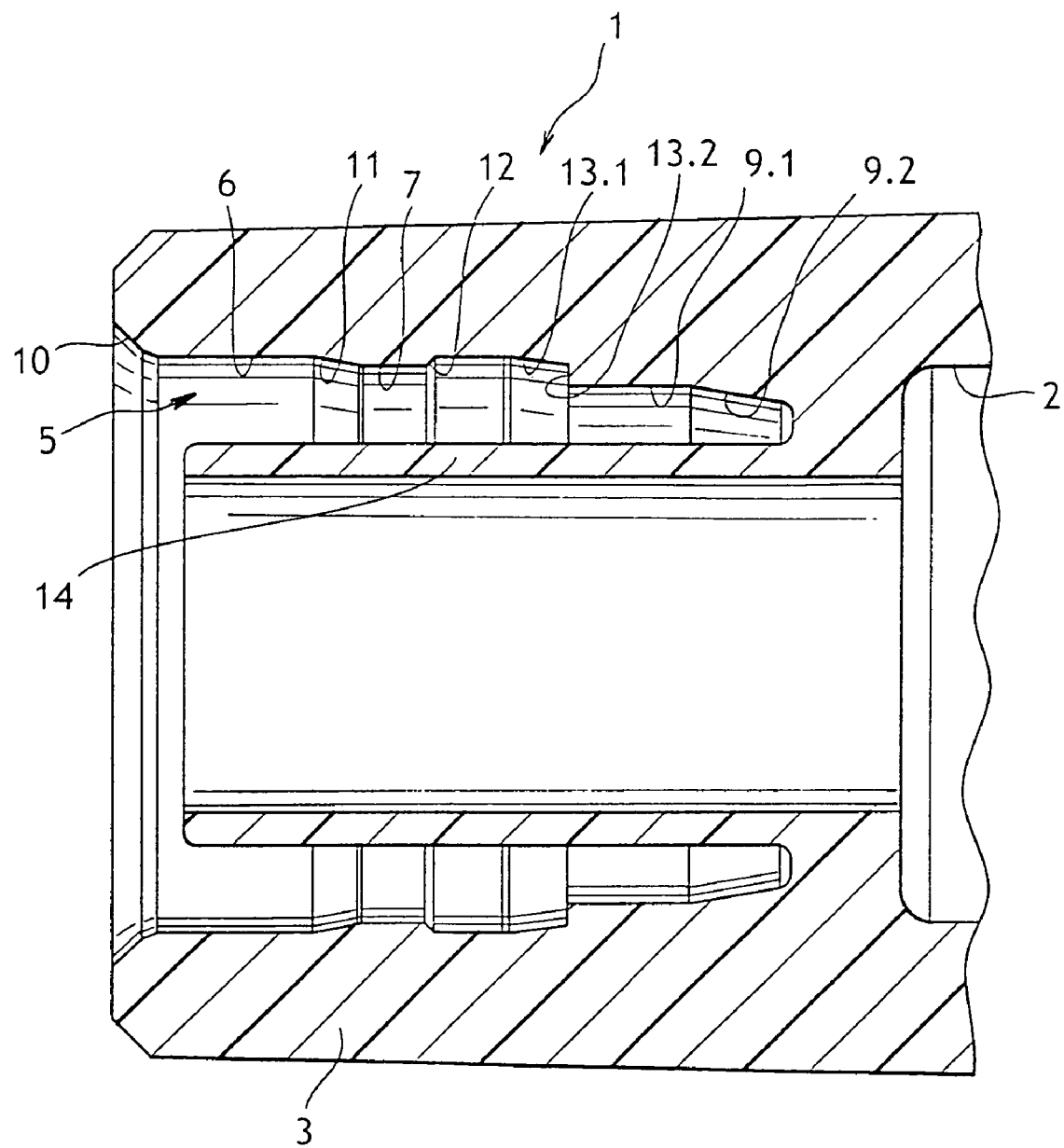
FIG. 1 is a fragmentary diagrammatic view in longitudinal section of a coupling element constituting a first embodiment of the invention.
Figure 2:
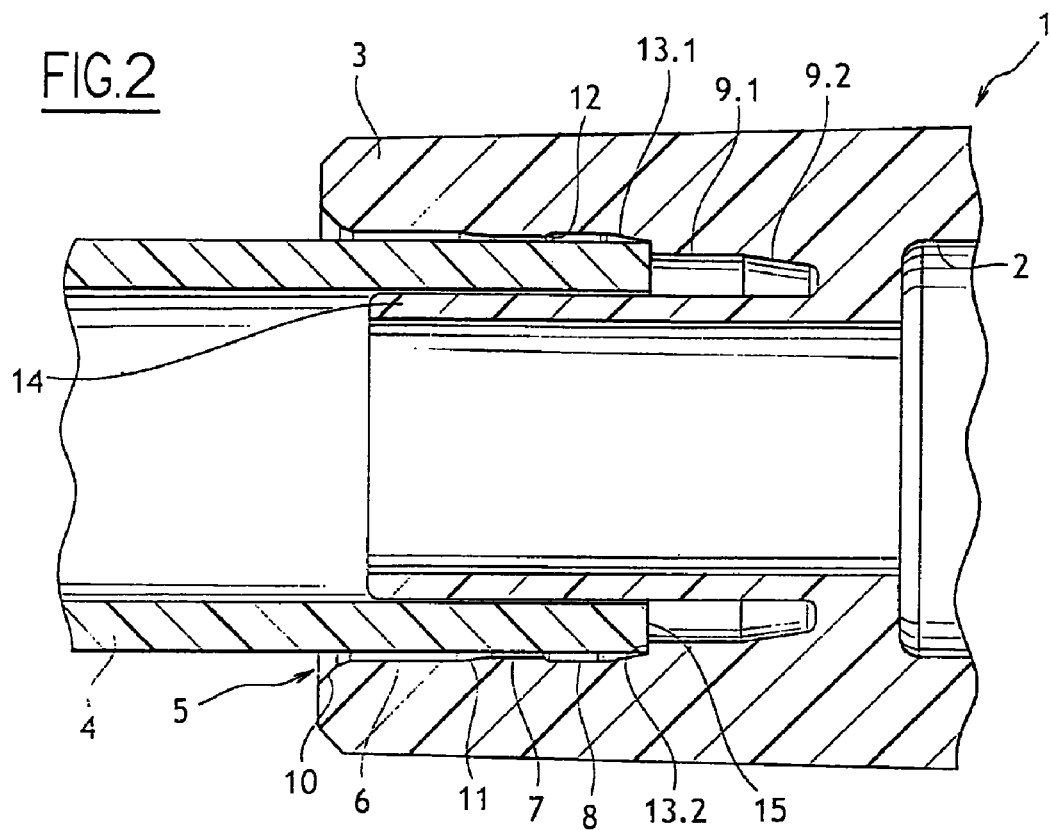
FIG. 2 is a view analogous to that of FIG. 1 at the beginning of the operation of welding a tube end in the coupling element.
Figure 3:
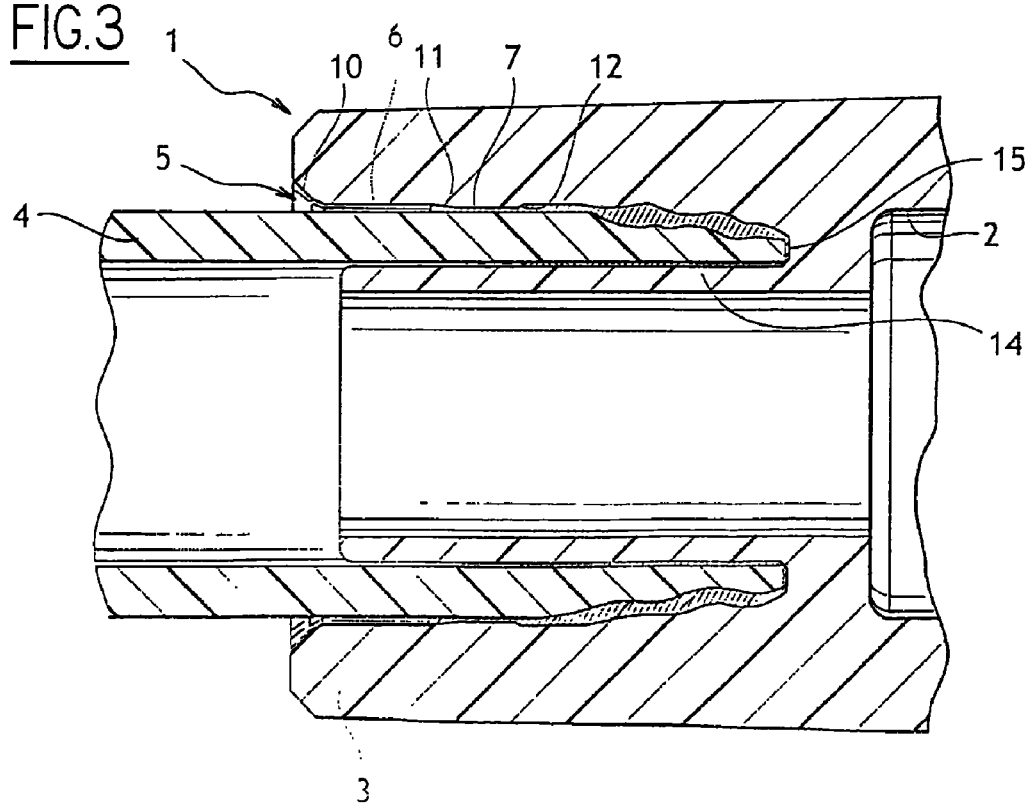
FIG. 3 is a view analogous to that of FIG. 1, at the end of the welding operation.

The invention is described below with reference to a coupling element, such as a coupling, comprising a body given overall reference 1, having formed therein a duct 2 opening out firstly into a body section 3 arranged to enable a tube end 4 to be coupled to the duct 2, and secondly into a section of the body (not shown in the figures) arranged to enable the duct 2 to be coupled to another tube end or indeed to a fluid-emitter member or a fluid-receiver member such as a tank, a pump, . . . . By way of example, this section may comprise an endpiece having Christmas-tree serrations, quick-coupling means such as a washer having teeth, or a moving locking element for coupling with an endpiece secured to the member.

The section 3 of the body 1 includes a housing, given overall reference 5, that is for receiving the tube end 4 and inside which the tube end 4 is to be friction welded. The duct 2 opens out coaxially into the housing 5.

The housing 5 comprises in succession in an axial direction: an inlet segment 6, a guide segment 7, a groove 8, and a welding segment 9.

The inlet segment 6 is cylindrical in shape and opens to the outside of the body 1 via a chamfer 10, and it is connected via a frustoconical surface 11 to the guide segment 7.

The inlet segment 6 is of diameter greater than the outside diameter of the tube end 4.

The guide segment 7 is cylindrical in shape and has a diameter smaller than the diameter of the inlet segment 6, but slightly greater than the outside diameter of the tube end 4, so as to receive it slidably with minimal transverse clearance.

The groove 8 is of diameter greater than the diameter of the guide segment 7 and has one flank 12 connecting it to the guide segment 7 and another flank 13 connecting it to the welding segment 9. The flank 12 is frustoconical in shape. The flank 13 has a frustoconical surface 13.1 beside the bottom of the groove and a radial annular surface 13.2 beside the welding segment 9.

The welding segment 9 has a diameter smaller than the outside diameter of the tube end 4. In this example, the welding segment 9 comprises a cylindrical portion 9.1 beside the groove 7, and remote from the groove 7 it has a blind frustoconical portion 9.2.

A tubular nose 14 extends coaxially inside the housing 5. The nose 14 is also arranged to constitute an appendix for guiding the tube end so that the housing presents a blind annular shape beside the portion 9.2 of the welding segment 9. The coupling element and the tube end are made of thermoplastic materials suitable for being welded together.

The tube end 4 is secured in the coupling element in the manner described below.

It is secured by friction welding. This welding technique is itself known. The method of the invention comprises a step of inserting the tube end into the housing 5 until the end face 15 of the tube end 4 comes into contact against the annular surface 13.2.

The tube end is then set into movement relative to the coupling element in such a manner that the end face of the tube end 4 rubs against the annular surface 13.2. This friction operation is implemented by causing the tube end 4 to rotate relative to the coupling element.

The rubbing of the end face 15 of the tube end 4 against the annular surface 13.2 causes localized heating of the tube and of the adjacent portion of the coupling element, thereby softening the material constituting the tube end and constituting the coupling element in this zone so as to begin welding the tube end 4 inside the coupling element.

With continuing insertion force, the tube penetrates into the welding segment 9 where it is finally welded.

During this penetration of the tube into the welding segment 9, some of the material constituting the tube end 4 is pushed back into the groove 8.

At the end of welding, the assembly comprising the tube end 4 and the coupling element is cooled. The portion of the tube that is pushed back into the groove then forms a bead that is in contact with the flank 12 of the groove 8 and that constitutes an abutment against the tube end 4 being extracted from the housing 5 of the coupling element.

Figure 4:
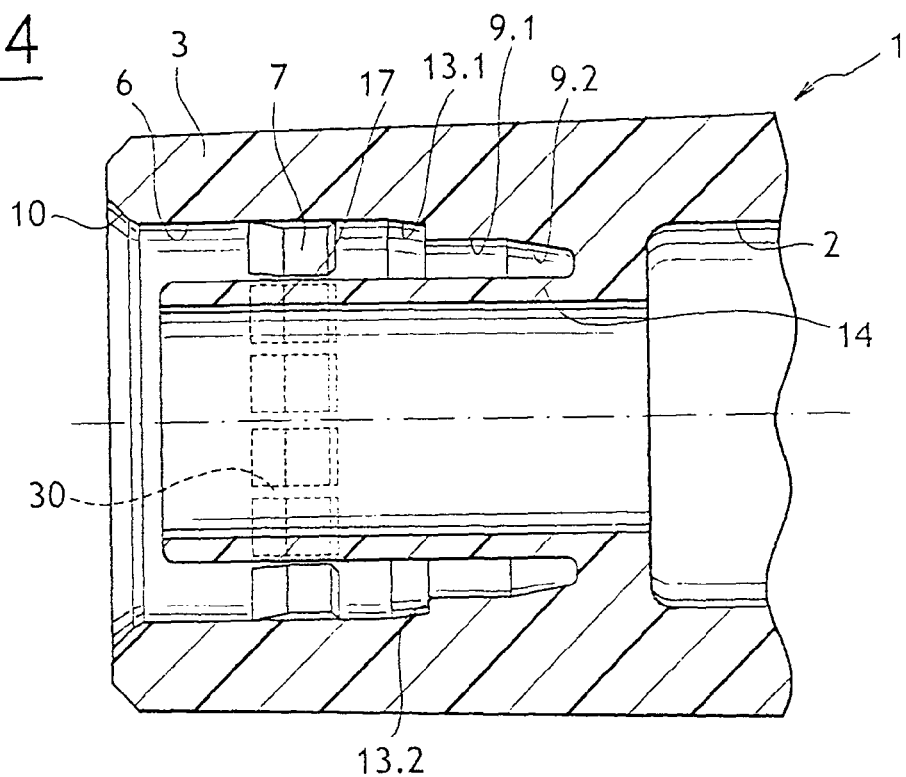
FIG. 4 is a view analogous to that of FIG. 1 showing a variant of the first embodiment.

In the variant shown in FIG. 4, the guide segment 7 is provided with axial indentations 17.

During welding, the material that is pushed back penetrates into these indentations and forms an obstacle to rotation of the tube. A single indentation can suffice to perform this function, and it could also be performed by some other shape that projects into the pushed-back material.

Figure 5:
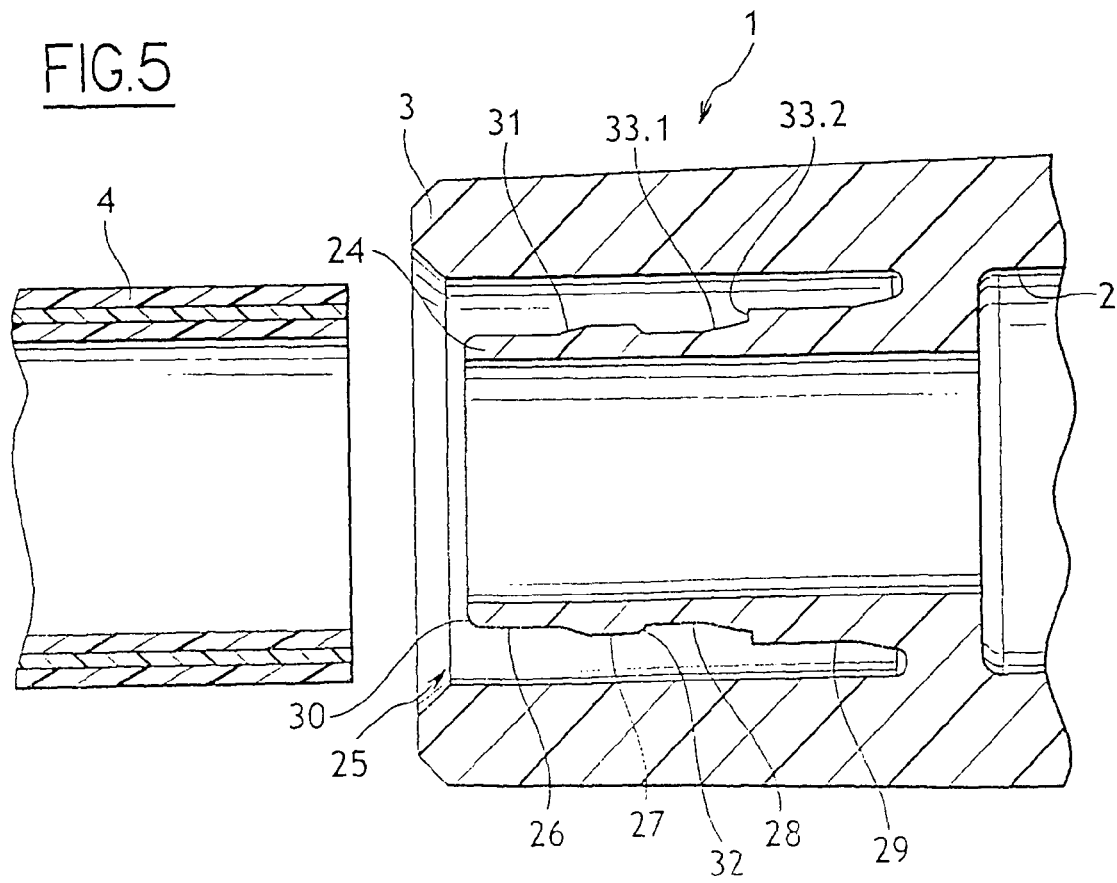
FIG. 5 is a view analogous to that of FIG. 1 showing a coupling element constituting a second embodiment of the invention.

With reference to FIG. 5, and in the second embodiment, the body 1 has a housing 25 into which a nose 16 extends coaxially. The housing 25 is thus annular in shape and the inside surface thereof is formed by the outside surface of the nose 16. The outside surface of the housing 25 is cylindrical in this embodiment. The outside surface of the nose 16 comprises an inlet segment 26, a guide segment 27, a groove 28, and a welding segment 29 that are arranged symmetrically relative to the various segments of the housing 5 described with reference to the first embodiment in order to perform functions that are identical.

The guide segment 27 thus has a diameter that is slightly smaller than the inside diameter of the tube end, the inlet segment 26 has a diameter smaller than that of the guide segment 27, and the groove 28 has a groove bottom of diameter smaller than the diameter of the guide segment 27. The welding segment 29 has a diameter greater than the inside diameter of the tube end.

The inlet segment 26 has a chamfered end 30 remote from a frustoconical surface 31 connecting it to the guide segment 27.

Beside the guide segment 27, the groove 28 has a flank 32 of frustoconical shape for forming an abutment for the pushed-back material, and beside the welding segment 9 it has a flank 33. The flank 33 comprises a frustoconical surface 33.1 adjacent to a radial annular surface 33.2.

The flank 32 of the groove 28 constitutes an abutment against extraction of the tube end from the housing 25, as in the first embodiment.

The tube in this embodiment is a multilayer tube having an inner layer made of a material that presents properties of being weldable with the material of the coupling element.

Figure 6:
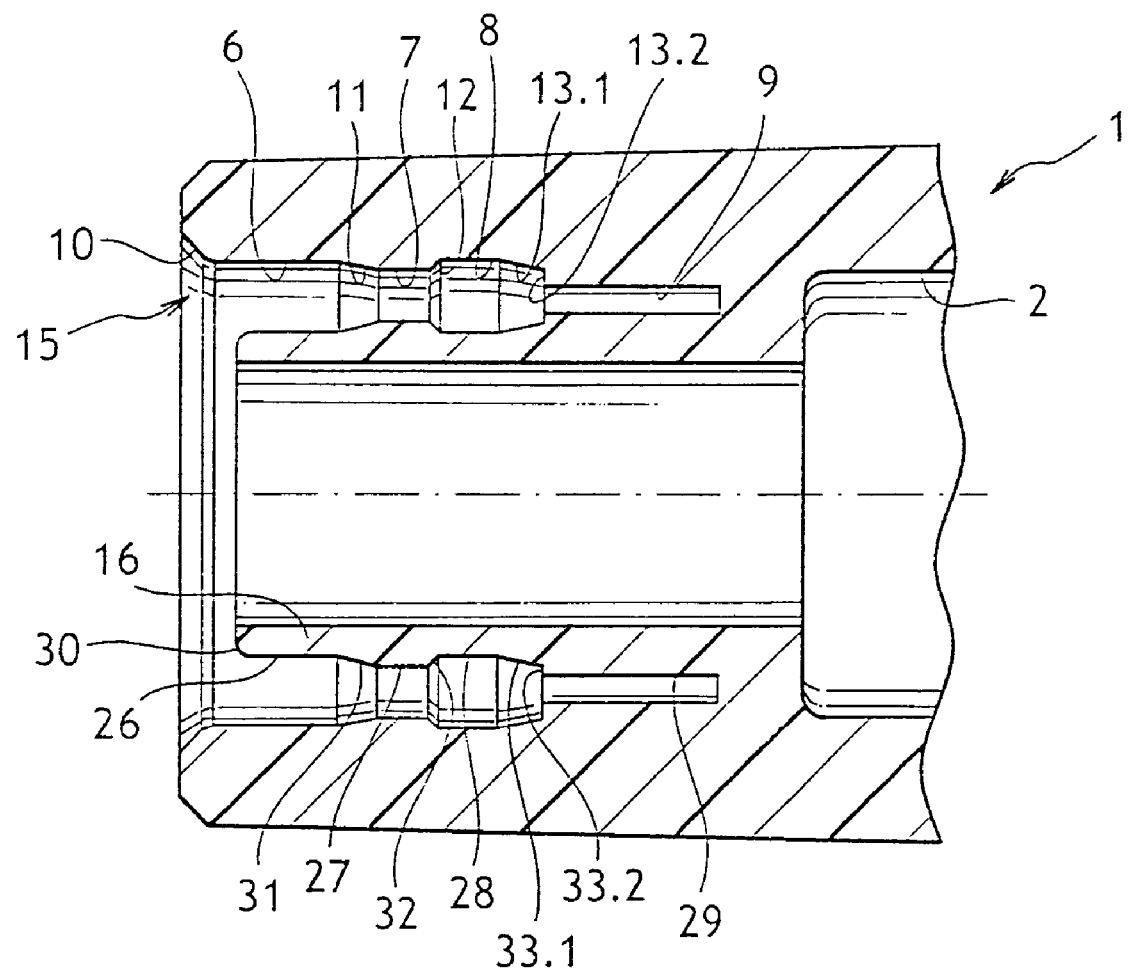
FIG. 6 is a view analogous to that of FIG. 1 showing a coupling element constituting a third embodiment of the invention.

With reference to FIG. 6, and in the third embodiment, the housing 45 for receiving the tube end is annular in shape being defined by an outer surface arranged like that of the first embodiment and an inner surface arranged like that of the second embodiment.

Naturally, the invention is not limited to the embodiments described and variants can be provided without going beyond the ambit of the invention as defined by the claims.

In particular, rubbing can also be implemented by causing the tube end 4 to vibrate relative to the coupling element.

The welding segment 9 could also be completely cylindrical or completely frustoconical.

In the first embodiment, it is possible to use multilayer tubes in which the outer layer is made of a material suitable for welding with the material of the coupling element.

The nose 14 is optional.

The flank 12 or 32 of the groove can be formed by a surface that is not frustoconical, for example a surface that is radial.

To form the obstacles to rotation of the tube, at least one portion in relief can be provided in the groove 8, 28. This portion in relief may be a projecting portion that can be in the form of a tongue or a stud, or a hollow portion such as an indentation. The groove may also have a circumference that is interrupted by a gap.

The invention claimed is:

1. A tubular element, the element comprising:
    a tube end welded in the tubular element by friction-welding for the purpose of transporting a fluid,
    a body (1) having a housing (5) formed therein to receive the tube end, the housing having an inlet segment (6) for the tube end and a welding segment (9) with an inlet defined by a surface (13.2) for initiating welding,
    wherein the welding segment (9) is cylindrical in shape and of diameter lying between the outside and inside diameters of the tube end,
    wherein the housing includes, between the inlet segment and the welding segment, at least one reception groove (8) receiving a portion of the tube end that is pushed back during welding, the reception groove having a flank with at least a portion forming the weld-initiating surface and on its other side an abutment flank for the pushed-back portion,
    each of the tube end and the tubular element are formed of a thermoplastic material, and
    the housing (5) includes, in the vicinity of the inlet segment (6), a guide segment (7) for guiding the tube end.

2. The element according to claim 1, wherein the housing (5) is annular in shape with an inside surface that is formed by an outside surface of a nose (14) secured to the element so as to be inserted inside the tube end.

3. The element according to claim 2, wherein the reception groove (28) is formed in the outside of the nose (16).

4. The element according to claim 1, wherein the housing (5) comprises in succession in an axial direction the inlet segment (6), the guide segment (7), the groove (8) and the welding segment (9).

5. The element according to claim 4, wherein the inlet segment (6) and the guide segment (7) are connected to each other via a frustoconical surface (11).

6. A method of friction welding an element to a tube end, the method comprising the steps of:
    introducing the tube end into a housing formed in the element and which has an inlet segment (6) for the tube end and a welding segment (9) with an inlet defined by a surface (13.2) for initiating welding,
    causing the tube end to rub against said surface for initiating welding in order to soften the material of the tube and of the element, and
    inserting the tube end in the welding segment of the housing in order to weld the tube end therein, a fraction of the material of the tube being pushed back, while the tube end is being inserted into the welding segment, in at least one reception groove (8) extending between the inlet segment and the welding segment, in such a manner that, after hardening, the pushed-back material co-operates with a surface of the element to constitute an abutment opposing extraction of the tube from the housing in the element,
    each of the tube end and the element are formed of a thermoplastic material, and
    wherein the housing (5) includes, in the vicinity of the inlet segment (6), a guide segment (7) for guiding the tube end.

* * * * *